Jan. 5, 1960 N. R. JOHANSON 2,920,182
APPARATUS FOR ELECTRIC RESISTANCE WELDING
TWO TUBES TO A SPACER STRIP
Filed July 13, 1956 2 Sheets-Sheet 1
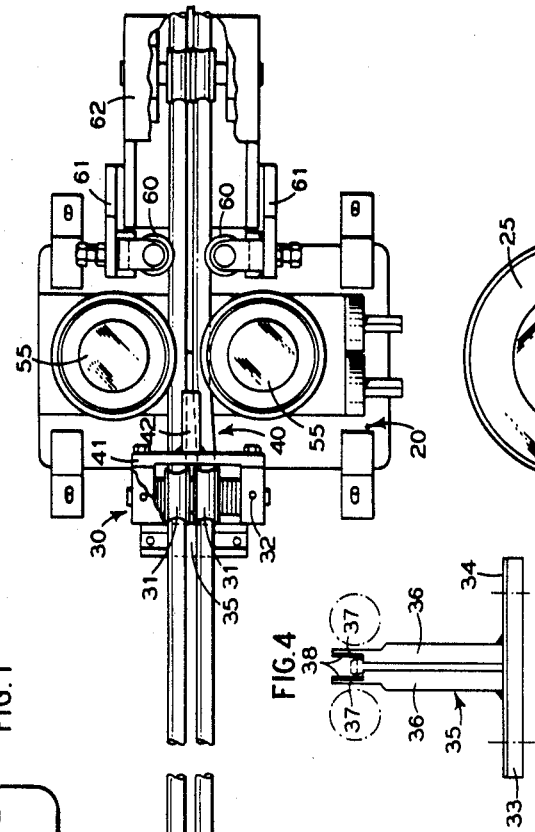
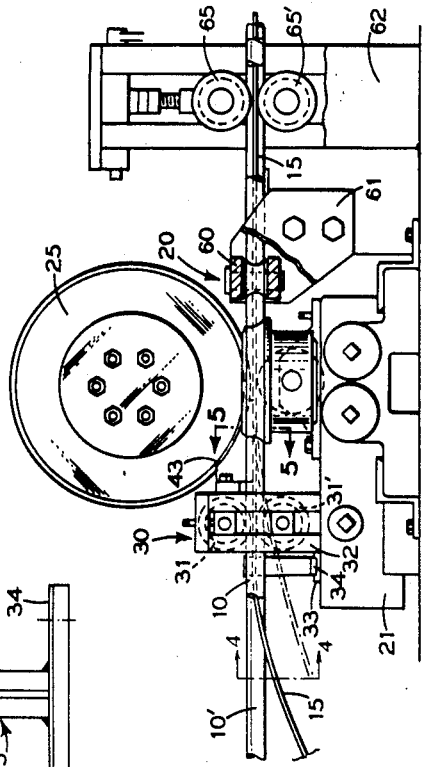
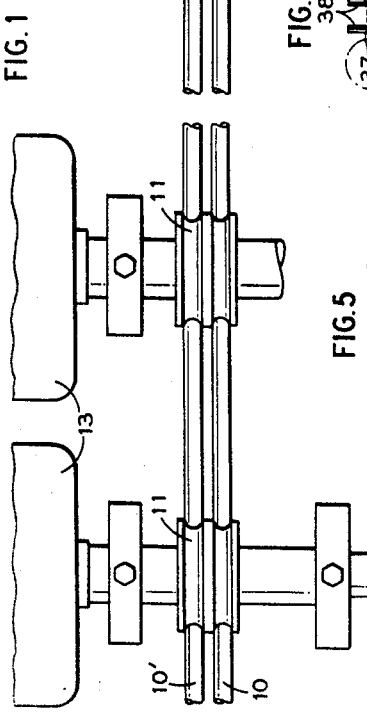
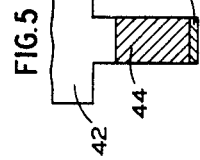
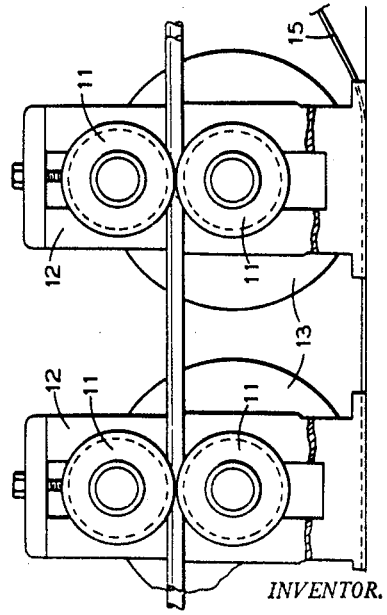
INVENTOR.
Norman F. Johanson
BY
ATTORNEY INVENTOR.
Norman F. Johanson
ATTORNEY United States Patent Office 2,920,182
Patented Jan. 5, 1960

2,920,182
APPARATUS FOR ELECTRIC RESISTANCE WELDING TWO TUBES TO A SPACER STRIP

Norman R. Johanson, Alliance, Ohio, assignor to The Babcock & Wilcox Company, New York, N.Y., a corporation of New Jersey Application July 13, 1956, Serial No. 597,680

10 Claims. (Cl. 219—102)

This invention relates to electric resistance welding apparatus for forming tubular heat exchanger elements by simultaneously and progressively forming electric resistance welds between a pair of metal tubes and the opposite side edges of a metal spacer strip or web compressed between the tubes.

It has been proposed previously to unite a pair of metal tubes in closely spaced, pressure-tight relation by fusion welding a metal web or spacer strip to the adjacent edges of the tubes. The welded structure thus produced is satisfactory from the standpoints of metallurgical soundness of the welds and meeting pressure stress requirements.

However, fusion welding, particularly of the arc welding type, is characterized by relatively high temperatures sufficient to melt substantial portions of the metal at the joints. These high temperatures result in relatively large heat affected zones in the welded members, with correspodingly increased distortion in the parts as welded. Relatively extensive and expensive post-weld heat treatment is required to effectively reduce or eliminate the locked-in stresses. In the particular example of fusion weld uniting closely spaced tubes by a spacer strip or web, extensive working of the welded structure is generally necessary to re-shape the same to a flat or planar state with the interconnected tubes being rectilinear.

Fusion welding techniques also are not as readily adapted to production line operations as are other welding techniques and, when so adapted, require relatively larger capital, operating, and maintenance expenses.

As described and claimed in the copending application of Lambert F. Kooistra, Serial No. 597,675, filed simultaneously herewith, it has been found that a pair of tubes, preferably having substantially congruent cross-sectional areas and being substantially identical in metallurgical composition, may be effectively weld-united to an intermediate spacer strip or web by electrical resistance welding the opposite edges of the strip to the tube walls. The welds thus formed are metallurgically sound and the welded structure is pressure-tight. In addition, due to the relatively high speed and relatively lower temperatures of the electric resistance welding operation, the temperature or heat induced stresses in the structure are greatly reduced, as compared to fusion welding, or substantially eliminated. Thus, post-weld finishing operations to restore the welded structure to planar form, with the tubes rectilinear, are also substantially, if not completely, unnecessary.

More specifically, in accordance with the invention, a pair of tubes and the spacer strip are moved longitudinally and in synchronized coordination between a pair of squeeze rolls engaging the outer surfaces of the tubes and converging the tubes into firm abutting contact with the opposite edges of the strip. As the three elements enter between the squeeze rolls, the tubes are engaged by rotary electrodes connected to opposite terminals of the secondary of a resistance welding transformer. The electrodes have surface-to-surface contact with the tubes on wall portions adjacent the strip edges so that a resistance welding current, of an appropriate value, flows from one tube through the strip and into the other tube. This welding current simultaneously electric resistance welds both strip edges to the tubes.

For an understanding of the invention principles reference is made to the following description of a typical embodiment thereof as illustrated in the accompanying drawing. In the drawing:

Figs. 1 and 2 are, respectively, plan and side elevation views of apparatus embodying the invention;

Fig. 4 is an elevation of the strip guide means;

Fig. 5 is a partial sectional view on the line 5—5 of Fig. 2; and

Figure 3:
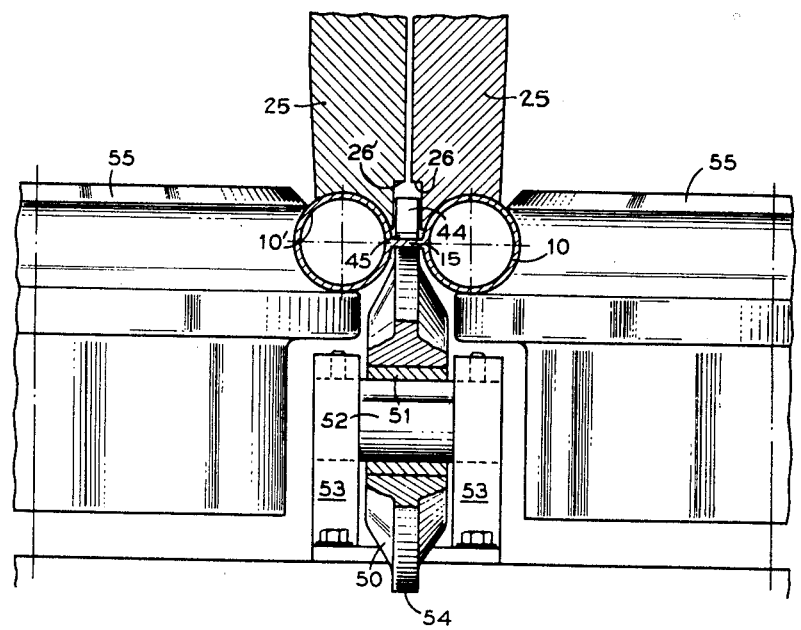
Fig. 3 is transverse sectional view of the apparatus, taken at the welding zone.
Figure 6:
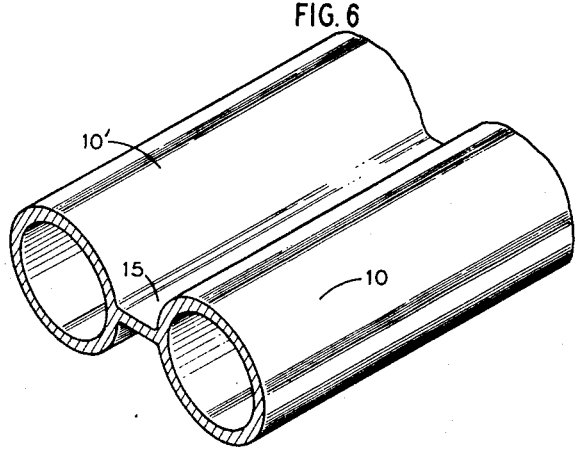
Fig. 6 is a partial perspective view of a heat exchanger element embodying the invention.

Referring to Figs. 1, 2 and 3, in accordance with the invention, a pair of steel tubes 10, 10' to be electric resistance welded to opposite edges of a spacer strip or web 15 are fed toward an electric resistance welder, generally indicated at 20, in synchronism with the feeding of steel strip 15 to the welder. Tubes 10, 10' are fed toward welder 20 by upper and lower drive rolls 11, 11, which maintain tubes 10, 10' laterally spaced a distance somewhat greater than the width of strip 15. Rolls 11, 11 are mounted in stands 12, 12 and driven by motors 13, 13.

At the entrance, or upstream, end of welder 20 is a guide stand for feeding tubes 10, 10' and strip 15 in proper relative relation to welding electrodes 25, 25. This guide stand, generally indicated at 30, is mounted on base 21 of welder 20 and includes laterally spaced pairs of upper and lower guide rolls 31, 31' mounted in supports 32 for relative vertical and lateral adjustment. Rolls 31, 31' have a lateral adjustment such as to maintain the lateral spacing of tubes 10, 10' at substantially the same value as set by drive rolls 11, 11.

Just in advance of rolls 31, 31', a guide 35 for strip 15 projects between tubes 10, 10'. As best seen in Fig. 4, guide 35 comprises a base 33 bolted to welder base 21 and having a groove in its upper surface receiving the horizontal legs 34 of a pair of strip guide members having vertical legs 36 welded to the inner ends of legs 34. Legs 34 are secured in position by the bolts or other fastening means securing base 33 to base 21.

The upper ends of legs 36 have their outer edges recessed for a clearance fit between tubes 10, 10'. The inner edge of the upper end of each leg 36 is formed with a rectangular recess 37 having a layer 38 of hard facing material, such as "Stellite," for example, on its vertical surface. The legs 36 are laterally spaced from each other, and this spacing, plus the combined depth of recesses 37, has a dimension only slightly greater than the width of strip 15 so that, for all practical purposes, strip 15 is in guided relation with surfaces 38.

As best seen in Figs. 1, 2, 3 and 5, an upper, or vertical position, guide 40 for strip 15 is mounted on the inner side of stand 30. Guide 40 is T-shape in plan, and comprises a head 41 bolted to supports 32 and a stem 42 welded to the head 41, and projecting downstream towards and between electrodes 25. The upper surface of stem 42 is arcuate over an intermediate portion of its length, as indicated at 43. The lower edge of stem 42 comprises a narrow rib 44 having a layer 45 of hard facing material on its undersurface. The width of rib 44 is somewhat less than that of strip 15, and layer 45 bears against the upper surface of strip 15 as the strip passes between electrodes 25.

As best seen in Fig. 3, strip 15 is held against surface 45 by a guide roll 50 mounted on a bearing 51 on a shaft 52 in supports 53 between squeeze rolls 55. The rim of guide roll 50 is formed as a circumferential rib 54 having a width of the order of that of rib 44.

In leaving rolls 31, 31', tubes 10, 10' have a lateral spacing greater than the width of strip 15. The tubes then pass between the squeeze rolls 55 which are adjusted, as to lateral spacing, to squeeze the tubes firmly against the side edges of strip 15 for passage of the welding current through the assembly by electrodes 25. Squeeze rolls 55 are mounted on base 21 for lateral adjustment in a manner well known to those skilled in the electric resistance welded tubing art. The squeeze rolls have contouerd peripheries engaging the outer sides of tubes 10, 10', as viewed in Fig. 3, from about the middle of the upper outer quadrants of the tubes to just pass the junctures of the two lower quadrants of the tubes. Rolls 55 thus support the tubes and have extensive surface and contour maintaining engagement therewith.

Electrodes 25, 25 are in electrical connection with opposite terminals of the secondary winding of a suitable resistance welding transformer. For example, electrodes 25 may be part of the secondary winding of a rotary seam welding transformer such as shown in U.S. Patent No. 2,666,121, issued to E. W. Allardt on January 12, 1954. As best seen in Fig. 3, the electrodes engage tubes 10, 10' over most of the upper inner quadrants of the tubes and part of the upper outer quadrants thereof, the outer peripheral edges of the electrodes being spaced from the upper peripheral edges of squeeze rolls 55. The inner peripheries of the electrodes are suitably recessed, as at 26, 26', to provide clearance for rib 44 of guide 40.

As the tubes and strip, in guided relation, pass through electrodes 25, 25, squeeze rolls 55 squeeze the tubes against the edges of strip 15 as resistance welding current flows, for example, from one electrode 25 into tube 10, across the junction of tube 10 and strip 15, through strip 15, across the junction of strip 15 and tube 10', into tube 10', and out through the other electrode 25. The resistance welding current thus flows through both tubes and the strip in series, simultaneously progressively forming resistance welds between each tube and the tube abutting edges of the strip, as the tubes and strip are converged and squeezed by rolls 55.

The welded structure leaving electrodes 25 and squeeze rolls 55 is held under lateral pressure by laterally adjustable squeeze rolls supported in brackets 61 on a trailing roll stand 62 adjustably mounting upper and lower guide rolls 65, 65'.

In a preferred embodiment of the invention, the strip and tube guiding means are so positioned and adjusted that the medial plane of strip 15 substantially coincides with the common diametric plane of tubes 10, 10' as the resistance welds are progressively formed simultaneously. Desirably, the thickness of strip or web 15 is of the order of the wall thickness of tubes 10, 10'. The relatively large line of contact of electrodes 25, 25 with the tubes provides for adequate current flow into and out of the tubes without burning of the electrode or tube surfaces.

While a specific embodiment of the invention has been shown and described in detail to illustrate the application of the invention principles, it will be understood that the invention may be embodied otherwise without departing from such principles.

What is claimed is:

1. Apparatus for forming a tubular component composed of a pair of laterally spaced relatively elongated pre-formed metal tubes integrally united by a longitudinal metal web therebetween electric resistance welded along its opposite edge to said tubes, said apparatus comprising, in combination, an electric resistance welder including a pair of coaxial rotary electrodes mounted in juxtaposed electrically insulated relation and connected to opposite polarity terminals of a source of welding current, each electrode having a curved tube engaging peripheral surface and the two tube engaging surfaces diverging from each other in a direction toward the electrode axis to engage the inner quadrants of a pair of pre-formed metal tubes moved in laterally spaced relation past the electrodes; first means constructed and arranged to feed a pair of pre-formed metal tubes in predetermined laterally spaced relation toward said electrodes; a guide roll stand immediately in advance of said welder and including guide rolls engaging said tubes to maintain said predetermined laterally spaced relation; second guide means constructed and arranged to laterally restrain and guide an elongated metal strip centrally between said tubes at said guide rolls; strip guide means extending into said welder between said tubes at tube portions engaged by the electrodes to engage said strip and maintain it in substantially the common diametric plane through the tubes at the electrodes; and squeeze roll means included in said welder and engaging the outer surfaces of said tubes as the tubes engage the electrodes to press said tubes firmly against the opposite side edge of said strip for flow of welding current from one electrode into one tube, through the strip and the other tube to the other electrode to simultaneously electric resistance weld both tubes to opposite side edges of said strip.

2. Apparatus as claimed in claim 1 in which said second guide means is positioned immediately in advance of said stand and extends between the tubes on each side of said strip.

3. Apparatus as claimed in claim 1 in which said strip guide means includes a stationary guide mounted on said stand to extend toward and between said electrodes and between the tubes and having a horizontal surface engaging the surface of said strip.

4. Apparatus as claimed in claim 1 in which said second guide means is positioned immediately in advance of said stand and extends between the tubes on each side of said strip; and said strip guide means includes a stationary guide mounted on said stand to extend toward and between said electrodes and between the tubes and having a horizontal surface engaging the surface of said strip.

5. Apparatus as claimed in claim 1 in which said second guide means includes a substantially vertical guide extending between the tubes immediately in advance of said stand and having an upwardly opening rectangular slot in its upper end at the level of the tubes and laterally restraining the strip.

6. Apparatus as claimed in claim 5 in which the sides of said slot have hard surface material thereon.

7. Apparatus as claimed in claim 1 in which said second guide means includes a substantially vertical guide extending between the tubes immediately in advance of said stand and having an upwardly opening rectangular slot in its upper end at the level of the tubes and laterally restraining the strip; and said strip guide means includes a stationary guide mounted on said stand to extend toward and between said electrodes and between the tubes and having a horizontal surface engaging the upper surface of said strip.

8. Apparatus as claimed in claim 1 in which said strip guide means includes a roller mounted between said electrodes in substantially the vertical axial plane thereof and having its upper periphery in substantially the common diametric plane through the tubes at the electrodes and engaging the under surface of said strip.

9. Apparatus as claimed in claim 1 in which said strip guide means includes a stationary guide mounted on said stand to extend toward and between said electrodes and between the tubes and having a horizontal surface engaging the upper surface of said strip; and a roller mounted between said electrodes in substantially the vertical axial plane thereof and having its upper periphery in substantially the common diametric plane through the tubes at the electrodes and engaging the under surface of said strip.

10. Apparatus as claimed in claim 1 in which said second guide means includes a substantially vertical guide extending between the tubes immediately in advance of said stand and having an upwardly opening rectangular slot in its upper end at the level of the tubes and laterally restrain the strip; and said strip guide means includes a stationary guide mounted on said stand to extend toward and between said electrodes and between the tubes and having a horizontal surface engaging the upper surface of said strip, and a roller mounted between said electrodes in substantially the vertical axial plane thereof and having its upper periphery in substantially the common diametric plane through the tubes at the electrodes and engaging the under surface of said strip.

References Cited in the file of this patent

UNITED STATES PATENTS

| | | |
|---|---|---|
| 1,564,892 | Phelps | Dec. 8, 1925 |
| 1,660,425 | Murray | Feb. 28, 1928 |
| 2,198,264 | Caputo | Apr. 23, 1940 |
| 2,198,265 | Caputo | Apr. 23, 1940 |
| 2,381,742 | Guirl | Aug. 7, 1945 |
| 2,618,845 | Quarnstrom | Nov. 25, 1952 |